United States Patent [19]

Yello

[11] 3,778,720

[45] Dec. 11, 1973

[54] INTERMEDIATE FREQUENCY AMPLIFIER CIRCUIT

[75] Inventor: Joseph F. Yello, Wood Dale, Ill.

[73] Assignee: Stewart-Warner Corporation, Chicago, Ill.

[22] Filed: Mar. 8, 1972

[21] Appl. No.: 232,881

[52] U.S. Cl. ..................... 325/318, 330/18, 330/22
[51] Int. Cl. ..................... H04b 1/24
[58] Field of Search ..................... 330/18, 19, 22, 40; 333/70 R, 76; 325/318, 319, 485, 488, 489, 492

[56] References Cited

UNITED STATES PATENTS 2,811,590 10/1957 Doremus et al. ..................... 330/18 X
3,358,246 12/1967 Bensasson ..................... 325/489

*Primary Examiner*—Benedict V. Safourek
*Attorney*—Augustus G. Douvas et al.

[57] ABSTRACT

An intermediate-frequency amplifier circuit for an NBFM paging receiver or the like comprises a multi-section resonant filter section, and a multi-stage non-resonant amplifier section. For maximum interstage coupling efficiency, minimum battery drain and maximum portection against strong-signal overload, the five individual amplifier stages of the non-resonant amplifier section are DC powered in series-connected groups of two and three. A limiter is provided for suppressing undesired AM modulation in the received signal and an emitter follower output stage is provided for interfacing with the receiver detector stage.

2 Claims, 3 Drawing Figures

INTERMEDIATE FREQUENCY AMPLIFIER CIRCUIT

BACKGROUND OF THE INVENTION

This invention pertains to selective paging receivers and more particularly to an improved intermediate-frequency amplifier circuit for use therein.

Selective paging systems have come into wide use for providing instantaneous communication with physicians, salesmen, repairmen and others whose work regularly takes them to locations where they may be out of contact with their offices for extended periods of time. With such systems it is only necessary that the subscriber carry on his person a radio receiver adapted to provide him with an audible alarm signal when an associated radio transmitter broadcasts a predetermined coded address signal. The subscriber than contacts his office by conventional communications means, e.g., public telephone, to ascertain the reason for which he is being paged.

One type of paging system which has proven successful is that wherein the subscriber address consists of a series of binary-coded pulses transmitted by narrow-band frequency modulation (NBFM) techniques on an assigned frequency in the 148–174 megahertz band. Each receiver in the system contains appropriate logic circuitry for analyzing the pulses to determine if its particular subscriber is being paged, and if so for sounding an audible alarm. One particularly attractive scheme for analyzing the binary pulses is to generate within the receiver in time coincidence with the received address code a local series of pulses constituting the subscriber's address code, and then to compare the pulses on a bit-by-bit basis.

To avoid false alarms and provide reliable response to subscriber address codes, it is desirable that the detached address code signal in paging receivers for such binary-code pulse-logic systems approximate the transmitted two-state binary signal as much as possible, even under extremely adverse receiving conditions. To this end, it is necessary that the receiver incorporate an intermediate-frequency amplifier having superior performance, i.e., selectivity and sensitivity, even under extremes of temperature, humidity, battery aging and mechanical shock. It is to an intermediate-frequency amplifier circuit which meets these objectives within the physical and battery drain constraints of a subscriber-carried paging receiver that the present invention is directed.

SUMMARY OF THE INVENTION

Accordingly, it is an object of the present invention to provide a new and improved intermediate-frequency amplifier circuit for a selective paging receiver.

It is a more specific object of the present invention to provide a new and improved intermediate-frequency amplifier circuit for a selective paging receiver which provides improved stability and sensitivity and requires less operating power than prior art circuit designs.

In accordance with the invention, a selective paging receiver of the type operable from an internal battery and having a converter stage for developing an intermediate-frequency subscriber address-bearing code signal incorporates an intermediate-frequency amplifier circuit having a predetermined overall bandpass characteristic and comprising a first amplifier device having input and output terminals and operable from an applied unidirectional current, and a second amplifier device having input and output terminals and operable from an applied unidirectional current. First signal translating means are provided for coupling the subscriber address-bearing intermediate-frequency signal from the converter to the input terminal of the first amplifier device, and second signal translating means are provided for coupling the intermediate-frequency signal from the output terminal of the first amplifier device to the input terminal of the second amplifier device. Circuit means are further provided for serially applying unidirectional current from the internal battery to the first and second amplifier devices.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
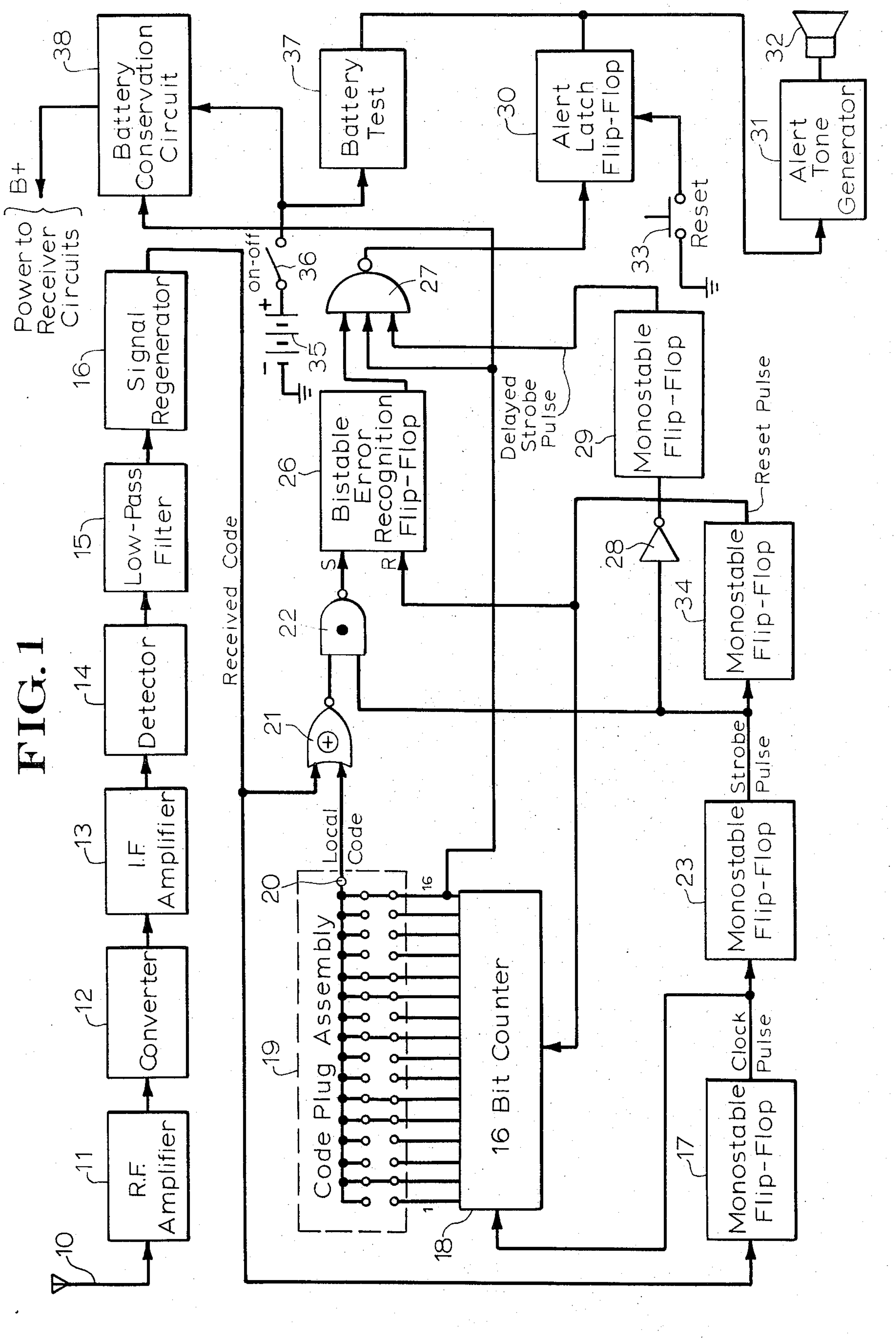
FIG. 1 is a block diagram of a receiver for a selective paging system embodying the present invention.

The intermediate-frequency amplifier circuit of the invention is shown in the embodiment of a VHF NBFM single-conversion superheterodyne paging receiver of the type adapted to recieve and analyze subscriber addresses in the form of a series of binary coded pulses. Before considering the inventive circuit in detail it is desirable to have a general working knowledge of this receiver as a whole, and to this end a preferred receiver is depicted in block diagram form in FIG. 1.

A received signal in the 148–174 MHz band is intercepted by an antenna 10, amplified by a radio-frequency (RF) amplifier 11, and converted to an intermediate-frequency by a converter 12. These stages, aside from considerations of miniaturization and low current drain, are conventional in design and may employ one or more tuned circuits to provide necessary selectivity for rejecting adjacent channel transmissions. The resulting intermediate-frequency (IF) signal, which may in practice be centered at 7 KHz, is applied to a novel IF amplifier 13. This circuit preferably comprises a plurality of voltage amplifier stages and tuned filters to obtain a desired bandpass characteristic for accommodating the frequency shifts of the received address code signals. In accordance with the invention, the amplifier stages are untuned and DC powered in a novel series configuration for maximum interstage coupling efficiency, minimum battery drain and maximum protection against strong-signal overload. This circuit will be covered in detail following our present analysis of the receiver as a whole.

The amplified intermediate-frequency output of IF amplifier 13 is applied to an FM detector 14, which in its simplest form may comprise a diode detector for converting the received binary coded signal into a digital signal comprising a sequence of high and low DC voltage levels. This signal is then applied to a 180 Hz low-pass filter 15 to prevent noise and extraneous non-address code-bearing signals from affecting the digital decoding process. Filter 15 in its simplest form may comprise a single RC filter network and one stage of compensating amplification.

To improve system reliability and performance the digital signal from filter 15 is applied to a novel signal regenerator stage 16 wherein the varying DC voltage levels from detector 14 are optimally shaped and amplitude-equalized for more reliable analysis by the address-recognition logic circuitry of the receiver. This stage automatically maintains a uniform code pulse width even in the face of signal amplitudes falling below the limiting threshold of IF amplifier 13, and in so doing contributes much to the operational reliability of the receiver. A preferred construction for this stage is covered in detail in the concurrently filed copending application of Ronald O. Williams, Ser. No. 232,882, which is also assigned to the present assignee.

The processed address code signal from signal regenerator 16 is coupled to the decoder portion of the receiver wherein it is analyzed to determine whether it is intended for that particular receiver. As previously mentioned, this analysis is accomplished by generating an internal address code in time coincidence with the received address code, and then comparing the two on a bit-by-bit basis. If the addresses are identical, the receiver alert tone is sounded.

While the exact code format is somewhat arbitrary, we will assume for the sake of the present discussion that the address format consists of 16 bits each comprising a time slot of approximately 10 milliseconds. Allowing 90 milliseconds reset period between addresses, it follows that 250 miliseconds or 0.25 seconds will be required for each full address, and that four addresses may be sent per second. If one of the 16 bits is reserved for parity checking, i.e., having the total number of high or low bits always add up to an odd or even number for transmission monitoring purposes, and if it is desired to have a hamming distance of two, i.e., each address at least two bits different from any other address, the 16 bit format yields 32,768 valid address codes.

Figure 2:
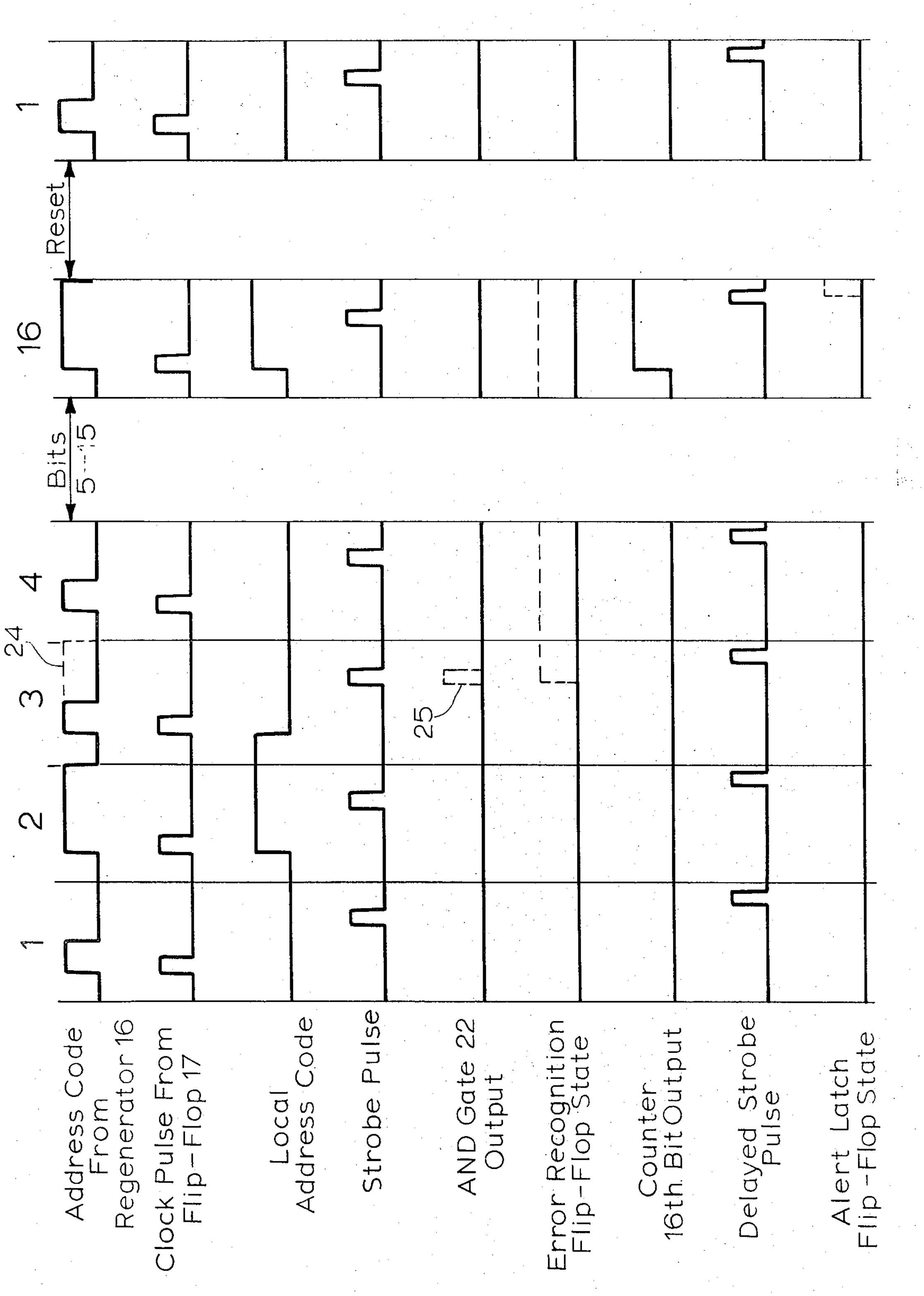
FIG. 2 is a graphical presentation of signal waveforms useful in understanding the operation of the receiver of FIG. 1.

Referring to FIG. 2, each of the 16 bits in the address code may be thought of as divided into four equal portions. In a valid address the first portion of each bit is always transmitted as a low and the second portion always transmitted as a high. The transition between low and high is recognized as a clock pulse by the decoding circuitry, and is used to synchronize the locally generated address with the received address. Specifically, in FIG. 1 the received address code is applied to a monostable flip-flop 17, which responds to the low to high transition to produce a clock pulse. The first 4 bits and the 16th bit of a representative address code as it would appear at the output of signal regenerator 16 is shown as the first trace, and the clock pulse output of flip-flop 17 as the second trace in FIG. 2.

The clock pulses from flip-flop 17 are applied to the input of a 16 bit counter 18. This counter has 16 output terminals which are cyclically rendered high, one at a time, as the counter advances from a reset or one count to a final or 16 count. The 16 output terminals are connected to respective ones of 16 terminals on a code plug assembly 19, which is arranged to connect selected ones of the terminals to a common output terminal 20. Thus, depending on which of the counter outputs are connected to terminal 20, a high-low address code is generated on terminal 20 as the counter is advanced from 1 through 16 by the clock pulses from flip-flop 17. This is seen in the third trace of FIG. 2.

The locally generated address code at terminal 20 is applied to one input of a two input exclusive OR logic gate 21, and the received address code from signal regenerator 16 is applied to the other input. As is well known to the art, logic elements such as exclusive OR gate 21 have operating states which may be defined in terms of high and low voltage conditions; a high voltage condition being approximately the reference or supply voltage, generally in the order of 5.0 volts for the most common logic elements, and a low being some value less than reference, generally near or equal to 0 volts or ground potential. Exclusive OR gate 21 assumes a high state only when its two inputs do not agree, i.e., one is high and the other is low. Otherwise it exists in a low state, producing an appropriate low output signal. This is put to advantage in the present instance to compare the received and local address codes on a bit-by-bit basis, producing an output only when the two codes do not agree.

To prevent minor timing irregularities in the received and locally generated signals from causing erroneous address comparisons, the comparison process is restricted to a short period of time at the mid-point of the data in each bit, i.e., between the third and fourth portions of the bit. To this end, the output of exclusive OR gate 21 is connected to one input of a two-input AND gate 22, the other input of which is connected to a source of strobe pulses occurring between the third and fourth portions of each address bit. Since AND gate 22 can assume a high state only when neither one of its inputs is low, and a positive-polarity strobe pulse is necessary on its second input to fulfill this condition, bit-by-bit comparison in exclusive OR gate 21 is effectively prevented from having any effect except during the strobe pulse. The strobe pulse is generated by a monostable flip-flop 23, which is triggered by the clock pulse from flip-flop 17 and is arranged to provide the necessary delay of approximately one-half time slot between the clock pulse and the mid-point of the data.

As can be seen in the fourth and fifth traces of FIG. 2, there is no disagreement in the present example and thus no output from AND gate 22. However, the first trace in FIG. 2 includes an alternate high state for its fourth bit, as indicated by the broken line 24. Had this signal been transmitted instead, the received address code would not have agreed with the locally generated address code, and a strobe-coincident output pulse would have been generated at the output of AND gate 22, as shown by the dotted line 25.

Should an output pulse be produced by gate 22 at any time during the 16 bits of the address, a bistable error recognition flip-flop 26 is actuated from its normal or reset state to its set state. The output of this flip-flop, high only in the reset state, is applied to one input of a three input logical AND gate 27. Another one of the inputs to this gate is connected to the 16th count output of counter 18, and the remaining input is coupled to flip-flop 23 through a delay network comprising an inverter 28 and a monostable flip-flop 29. The latter connections prevent an output from AND gate 27 except when counter 18 is in its 16th or final counting state, and the 16th bit strobe pulse from flip-flop 23 has occurred. Inverter 28 and flip-flop 29 delay the strobe pulse applied to gate 27 sufficiently to insure that the local and received 16th bit code pulses will have been compared prior to recognition of an error.

When flip-flop 26 is in its reset state (i.e., no error in the codes), counter 18 is in its 16th or final counting state, and the strobe pulse for the 16th address bit has occurred, the output of AND gate 27 becomes high and forces an alert latch flip-flop 30 to transition to its latched state. This causes current to be supplied to an alert tone generator 31, which causes an alert tone in an associated loudspeaker 32. A reset switch 33 is provided to allow the subscriber to reset flip-flop 30 after receiving the alert.

If the local and received address codes do not agree, flip-flop 26 is actuated, AND gate 27 is inhibited, and an alert is not sounded. In any event, approximately 40 miliseconds after the last address code bit a retriggerable monostable flip-flop 34 returns to its low state, and in so doing resets counter 18 and error recognition flip-flop 26 during the 90 millisecond reset period between code addresses.

Operating power for the receiver is provided by a battery 35, which is preferably a compact rechargeable type such as nickel-cadmium. The negative battery terminal is grounded, and the positive terminal is connected by means of a single pole, single-throw power switch 36 to a battery test circuit 37, and to the various receiver circuits by a battery conservation circuit 38. This circuit functions to periodically cycle the receiver on and off pending receipt and recognition of valid 16 bit address codes. Upon receipt of a valid address, the on-off cycle ceases and the receiver is maintained in a constant on state to permit normal reception of address codes. When valid address codes are no longer received, the conservation circuit reverts back to an on-off cycle after a short time delay. Since the on portion of the cycle is in practice only approximately 1 second long, and the off cycle approximately 9 seconds long, the savings in battery energy is substantial. A preferred construction for this circuit is covered in detail in the concurrently filed copending application of Ronald O. Williams, Ser. No. 232,878, which is also assigned to the present assignee.

Figure 3:
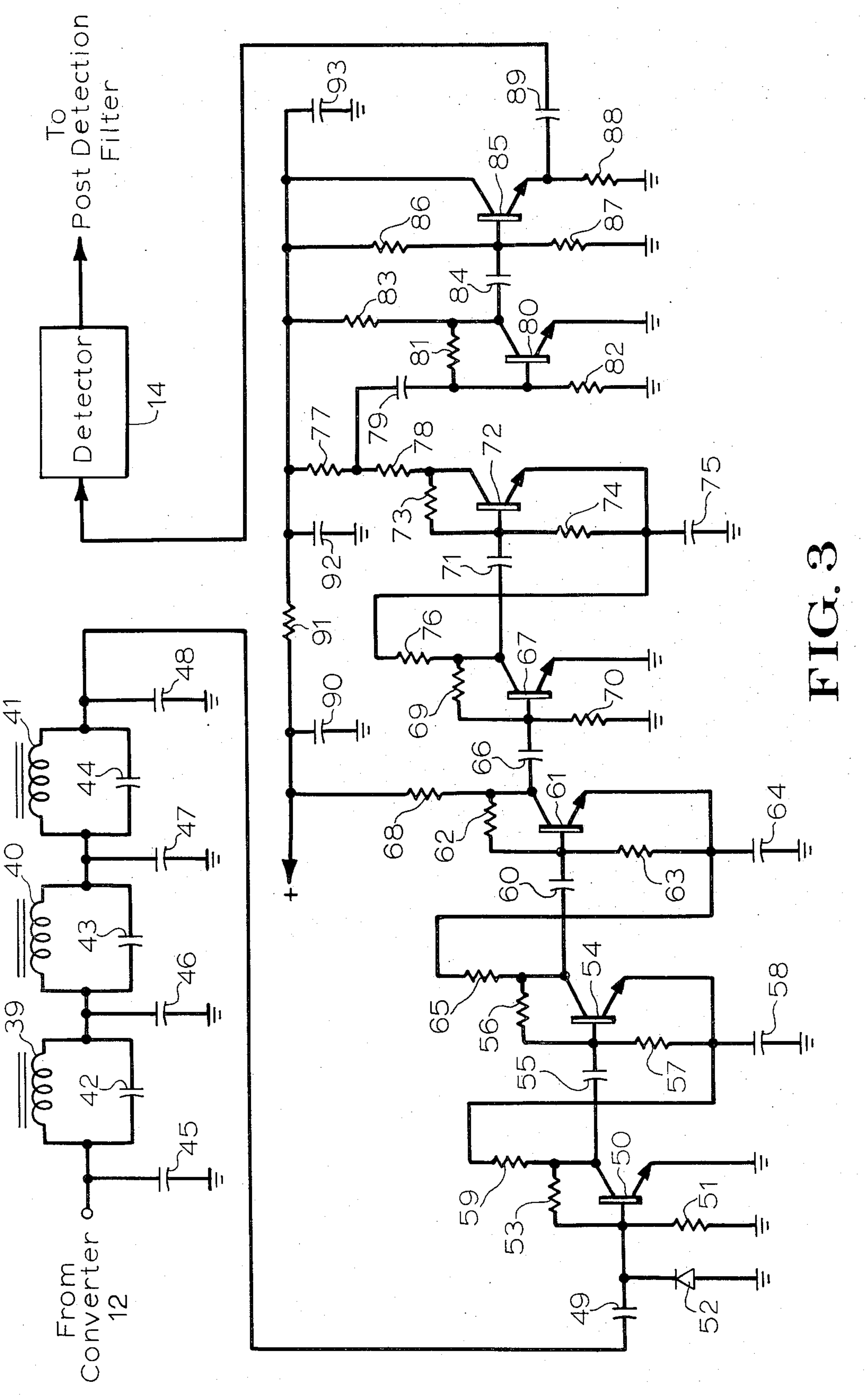
FIG. 3 is a schematic diagram of an intermediate-frequency amplifier circuit constructed in accordance with the invention.

Having considered the operation of the receiver as a whole, we are now in a position to consider in detail the circuitry of the intermediate-frequency amplifier 13, which is detailed in FIG. 3 and to which the present invention is directed. Referring to FIG. 3, the intermediate-frequency output of converter 12 is seen to be applied to a first translating means in the form of a three-section elliptical filter. This filter comprises toroidal inductors 39–41, each individually tuned to resonance at selected frequencies above the desired passband of the IF amplifier by respective ones of three shunt-connected capacitors 42–44. The input side of the first filter section, comprising inductor 39, is coupled to ground by a capacitor 45. Similarly, the juncture of inductors 39 and 40 is coupled to ground by a capacitor 46, the junction of inductors 40 and 41 is coupled to ground by a capacitor 47, and the output of the last filter section is coupled to ground by a capacitor 48. Capacitors 45–48 being each connected to a plane of reference potential, the receiver chassis ground, a conventional three-section elliptical-type filter circuit configuration is obtained.

The output of the three-section filter is coupled by a series coupling capacitor 49 to the input terminal or base of a first amplifier device in the form of an NPN transistor 50. The common electrode or emitter of this transistor is grounded, and the base is connected to ground by the parallel combination of a resistor 51 and a diode 52. The base is also connected to the collector of the transistor by a resistor 53. The output terminal or collector of transistor 50 is connected to the input terminal or base of a second amplifier device in the form of another NPN transistor 54 by a second signal translating means in the form of a coupling capacitor 55. The base of transistor 54 is connected by a resistor 56 to the collector of the transistor, and by the series combination of a resistor 57 and a capacitor 58 to ground. The common electrode or emitter of transistor 54 is connected directly to the juncture of resistor 57 and capacitor 58, and by a resistor 59 to the collector of transistor 50.

The output terminal or collector of transistor 54 is connected by a third translating means in the form of a coupling capacitor 60 to the input terminal or base of a third amplifier device in the form of a third NPN transistor 61. The base of transistor 61 is connected to the collector of the transistor by a resistor 62 and to chassis ground by the series combination of a resistor 63 and a capacitor 64. The common electrode or emitter of transistor 61 is connected directly to the juncture of resistor 63 and capacitor 64, and by a resistor 65 to the collector of transistor 54. The output terminal or collector of transistor 61 is connected by a translating means in the form of a coupling capacitor 66 to the input terminal or base of a fourth amplifier device in the form of an NPN transistor 67, and by a resistor 68 to the receiver B+ supply. The common electrode or emitter of transistor 67 is grounded, and the base is connected by a resistor 70 to ground. The output terminal or collector is connected by translating means in the form of a coupling capacitor 71 to the input terminal or base of a fifth amplifier device in the form of an NPN transistor 72. The base of this transistor 72 is connected by a resistor 73 to the collector of the transistor and by the series combination of a resistor 74 and a capacitor 75 to ground. The common electrode or emitter is connected directly to the juncture of resistor 74 and capacitor 75, and by a resistor 76 to the collector of transistor 67. The output terminal or collector of transistor 72 is connected to decoupled receiver B+ by a pair of series-connected collector load resistors 77 and 78, and the juncture of these resistors is connected by a coupling capacitor 79 to the base of a limiter-amplifier device comprising an NPN transistor 80.

The emitter of transistor 80 is grounded, and the base is connected by a resistor 81 to the collector of the transistor and by a resistor 82 to ground. The collector of transistor 80 is connected by a resistor 83 to decoupled receiver B+, and by a coupling capacitor 84 to the base of an emitter-follower converted amplifier device, NPN transistor 85. The collector of transistor 85 is connected to the decoupled receiver B+ bus by a resistor 86, and to ground by a resistor 87. The emitter of transistor 85 is connected to ground by a resistor 88, and to the input of the receiver detector 14 by a coupling capacitor 89.

The individual amplifier stages of IF amplifier 13 require B+ isolation, and to this end the receiver B+ source to which collector load resistor 68 is connected is by-passed to ground by a capacitor 90, and filtered by a resistor 91 and additional by-pass capacitors 92 and 93 prior to application to the collector circuits of transistors 72, 80 and 85.

In operation, the 7 KHz intermediate-frequency signal from converter 12 is applied to the three-section elliptical filter comprising inductors 39–41 and capacitors 42–48. This filter establishes the high-frequency shoulder of the overall bandpass characteristic of IF amplifier 13, the 3 db points being established at 2 KHz and 12 KHz to accommodate the 5 KHz maximum frequency deviation of the NBFM signal. While the design of elliptical filters is well known to the art, the present filter is unique in that it utilizes toroidal coils for its inductive elements. This obviates the need for tunable coils and capacitors, which would be impracticable for the values of inductance required by the very low 7 KHz IF center frequency, and makes full use of the primary attributes of toroidal inductors; high inductance and small physical size. Normally, such closed-loop toroidal inductors are unrealistically difficult to tune because their permeability changes appreciably with applied AC drive and temperature. In the present embodiment these difficulties were overcome by designing the toroid inductance values to correspond to the signal drive levels experienced during weak signal conditions and during strong adjacent channel signal conditions. Temperature variations were compensated for by careful selection of the temperature coefficient of the various capacitors of the filter. The result is that the illustrated three-section elliptical filter is incorporated in production paging receivers without the need for individual tuning adjustments.

The output of the three-section toroid filter is coupled by capacitor 49 to the base of the first IF amplifier transistor 50. Diode 52 serves to limit the peak amplitude of the signal thus applied to prevent overdriving transistor 50, and resistors 51 and 53 serve as a conventional base bias network. The applied signal, after amplification in transistor 50, appears across collector load resistor 59 and is coupled by capacitor 55 to the base of the second IF amplifier transistor 54. Resistors 56 and 57 provide a conventional base bias circuit transistor 54, and capacitor 58 serves to maintain the emitter at signal ground potential. It should be noted that the collector of transistor 50 receives unidirectional operating current from the emitter of transistor 54, resistor 59 forming part of a unidirectional circuit means for effectively operating the two transistors in series for reasons to be presently explained.

The applied signal, after amplification by transistor 54, appears across collector load resistor 65 and is coupled by capacitor 60 to the base of the third IF amplifier transistor 61. Resistors 62 and 63 bias the base of this device in a conventional manner, and capacitor 64 maintains the emitter at ground potential relative to the applied 7 KHz signal. It should again be noted that transistor 54 receives its operating current from the emitter of transistor 61, resistor 65 forming in conjunction with resistors 59 and 68 unidirectional circuit means for effectively connecting the three transistors in series for DC purposes.

The amplified signal from transistor 61 appears across collector load resistor 68 and is coupled by capacitor 66 to the base of the fourth IF amplifier transistor 67. Resistors 69 and 70 conventionally bias the base of transistor 67. The amplified IF signal from transistor 67 appears across collector load resistor 76, and is coupled by capacitor 71 to the base of the fifth IF amplifier transistor 72. Resistors 73 and 74 serve as a conventional base bias network for this transistor, and the amplified IF signal therefrom appears across the series-connected collector load resistors 77 and 78. It should be noted that transistor 67 receives its operating power from the emitter of transistor 72, the latter being maintained at AC ground potential relative to the applied IF signal by capacitor 75.

It has been noted that transistors 50, 54 and 61 are connected in series with respect to their DC operating current paths, instead of in the usual parallel connection. And similarly, transistors 67 and 72 receive operating power by means of series circuit arrangement. The novel series interconnections for these transistors contribute much to the overall performance of IF amplifier 13. First of all, each stage can be biased identically for optimum DC stability. In practice the three series-connected amplifiers are engineered to operate from a supply voltage slightly less than one-third of the battery voltage, and the two series-connected amplifiers are engineered to operate from a supply voltage slightly less than one-half the battery voltage. Secondly, because each transistor operates on an overall voltage supply of less than one-third of the total receiver B+ voltage, there is less possibility of over-driving the latter stages in each series string. Thirdly, higher overall gain is realized because the input-output impedances can be more closely matched than is possible with the usual interstage coupling transformers. Finally, there is cumulative filtering of the B+ among the stages, the filter in each subsequent stage in the series strung amplifiers serving as a filter for the B+ supplied to the previous stages.

Perhaps the most important attribute of the series arrangement is that the overall current drain of IF amplifier 13 is substantially reduced. In practice the total current drain for the three series amplifier stages is only 350 microamperes, and for the two series stages only 500 microamperes, for a 8.0 volt battery supply. Yet, the total gain of the five active stages is very high, in the order of 110–130 db in practice.

The output of the 5th amplifier stage appears across the entire load impedance comprising series-connected resistors 77 and 78. To avoid over-driving transistor 80, this load is tapped down so that only the portion of the IF signal appearing across resistor 78 is applied to transistor 80. Transistor 80 is biased to operate as a limiter, and is powered by the full 8.0 volt battery supply voltage for maximum gain and output. Its operation in this respect is entirely conventional, and the limited output signal therefrom is coupled by capacitor 84 to transistor 85. The latter transistor operates as a conventional emitter follower, providing isolation for the limiter stage and a low output impedance to detector 14. Capacitor 89 couples the amplified output signal from resistor 88 to detector 14.

It should be noted at this point that the five active amplifier stages incorporate no tuned circuits. Instead, the present design achieves selectivity in a single resonant network, i.e., that comprising toroidal inductors 39–41. This not only enables the five active gain stages to be powered in series for minimum current drain, but also results in substantially reduced space requirements and component count for the IF amplifier stage. The only frequency characteristic intended for the five gain stages is that they impart a low-frequency roll-off at approximately 2 KHz to obtain the low-frequency shoulder of the desired bandpass characteristic, which is readily accomplished without additional components by careful choice of the interstage coupling capacitor 49, 55, 60, 66, 71, 79 and 84.

Thus, a novel IF amplifier stage design has been shown which meets the severe requirements of a subscriber-carried receiver in a selective paging system. Stability is improved and size requirements reduced by separating the frequency-selective circuits from the amplifying circuits. Battery drain is maintained at a minimum and interstage coupling efficiency is improved by a novel series interconnection of the active amplifier stages. Finally, the IF amplifier makes maximum use of state-of-the-art components and techniques, further enhancing system reliability and performance.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a selective paging receiver of the type having a self-contained power source and a converter stage for developing an intermediate frequency address code signal having a frequency intermediate 2KHz and 12KHz, an intermediate frequency amplifier circuit comprising:

first and second amplifier stages each including a plurality of successively arranged transistors with each transistor having a base, emitter and collector circuits, a resistor connecting the collector circuit of the last transistor of each stage to one terminal of said power supply, means connecting the emitter circuit of the first transistor of each stage to the other terminal of said power supply, a resistor interconnecting the emitter circuit of the preceding transistor of each stage to the collector circuit of the succeeding transistor of the respective stage for completing a serial direct current conduction path from the collector circuit of the last transistor of each stage through the emitter circuit of the first transistor of each stage, a voltage divider connecting the base circuit of each transistor to the collector and to the emitter circuit of the respective transistor with each divider valued to provide a bias voltage of the same value for each transistor base circuit, a coupling capacitor connecting the collector circuit of each transistor directly with the base circuit of the succeeding transistor of the respective stage and the collector circuit of the last transistor of the first stage with the base circuit of the first transistor of the second stage for rejecting frequencies below 2KHz, a plurality of serially connected toroidal coils each having a tuning capacitor in shunt therewith for rejecting frequencies above 12KHz with the first one of said coils coupled to said converter stage for receiving a signal from said converter stage, a by pass capacitor connected between each coil end and said other power supply terminal, and a last capacitor interconnecting the last one of said coils with the base circuit of the first transistor of the first stage for coupling the output of said coils to said transistors.

2. In the amplifier circuit claimed in claim 1, a diode connected between the base circuit of said first stage first transistor and said other power supply terminal for limiting the peak amplitude of the output of said coils to said first stage first transistor.

* * * * *